Aug. 6, 1946.　　　W. M. SCOTT, JR　　　2,405,454
CIRCUIT INTERRUPTER AND CONTROL THEREFOR
Filed Jan. 3, 1941　　　9 Sheets-Sheet 2

INVENTOR.
William M. Scott Jr.
BY
Samuel Ostrolenk
ATTORNEY.

INVENTOR.
William M. Scott Jr.
BY
Samuel Ostrolenk
ATTORNEY.

Patented Aug. 6, 1946

2,405,454

UNITED STATES PATENT OFFICE 2,405,454

CIRCUIT INTERRUPTER AND CONTROL THEREFOR

William Maxwell Scott, Jr., Bryn Mawr, Pa., assignor to I. T. E. Circuit Breaker Company, Philadelphia, Pa., a corporation of Pennsylvania Application January 3, 1941, Serial No. 373,051

9 Claims. (Cl. 200—82)

My invention relates in general to the field of circuit interrupters and more specifically concerns a novel and improved form circuit breaker and a control means therefor.

It is frequently possible in certain polyphase circuits that a single phase thereof may, under faulty conditions, carry a current many times in excess of its rated value whereas the associated phases will continue to carry substantially normal currents. Under these circumstances, it is particularly desirable to have an extremely high speed circuit breaker operate in the overloaded circuit with the subsequent interruption of the other circuits.

More specifically, in the operation of a polyphase mercury arc rectifier, it is often that a single anode may, due to a "back fire" or similar electronic fault carry excessive currents while normal conditions will prevail in the associated anode circuits.

It is obvious from mechanical considerations that a multiple breaker, wherein all of the poles are rigidly interlocked will require more time for interruption than a single pole breaker in the affected circuit. Therefore, in order to preclude possible destruction of the overloaded anode and its energizing circuits, it is desirable to have a high speed single pole circuit breaker in the anode circuit operate independently to open the affected anode circuit instantaneously. To complete the isolation of the rectifier, it is then necessary to actuate the remaining poles of the circuit breaker to cause the separation of all of the contacts.

My invention contemplates a high speed single pole circuit breaker of simple design which is particularly adaptable for use in the protection of polyphase circuits of the character described. Thus, I may combine a plurality of these single pole elements upon a common frame to form a multipole breaker in which each of the poles may open its contacts independently of the other poles. Normally, however, the contacts of all of the poles may be simultaneously engaged and separated.

The single pole circuit breaker comprises essentially a pair of cooperable contacts, spring biased toward the open position, which may be engaged and maintained in engagement by any suitable pneumatic, electrical or mechanical means. Thus, compressed air may be introduced into a cylinder on each circuit breaker, and act upon a piston to cause circuit closures. However, if desired, a solenoid or an electric motor may be utilized for this purpose.

The contacts of the individual circuit breaker poles may be separated by releasing the closing means or by automatically or manually disengaging a latch. This latch is carried upon a lever intermediate between the piston and a pivoted arm which carries the movable contact. In either case, however, the contacts will separate under the influence of the normal spring biasing means.

Trip free operation is provided by the latch and its associated contact carrying arm and thus the contacts will be automatically disengaged if closed upon a fault despite the continued operation of the closing mechanism.

Each circuit breaker pole includes an over-current trip unit operatively arranged with respect to the latch, which may be of the conventional electromagnetic type. Thus over-current in one of the plurality of single pole circuit breakers will cause instantaneous interruption thereof. Due to the independence of the contact mechanisms, the compressed air within the closing cylinders of the associated breakers (assuming a pneumatically operated closing mechanism) will still maintain contact engagement. However, I provide an interlocking control system for the individual poles of the multipole breaker which in one form includes a switch on each of the circuit breaker poles actuated by displacement of the movable contact. These switches are arranged to energize the compressed air control means so that upon the separation of the contacts of an individual breaker due to automatic or manual energization, the compressed air within all closed cylinders will be released to effect complete isolation of the circuit into which the breaker is connected. This manner of interlocking the several poles employed may, of course, be employed with any other closing system.

The individual circuit breakers are provided with any arc extinguishing or arc quenching structure such as a magnetic blow-out.

In my novel circuit breaker, the movable contact and the closing apparatus required for each pole are supported within a metallic frame. This frame is mounted upon a pair of supporting members which in turn are carried by the main frame of the multipole breaker. The supporting members also carry the arc chute which is hingedly attached thereto to facilitate contact inspection and repair.

A preferable pneumatic control system comprises a valve which determines the flow of air to a manifold communicating with each of the single pole closing cylinders. The valve may be operated manually by a pair of plungers, or may be operated automatically by solenoids which are in operative arrangement with respect to the plungers.

Energization of one of these solenoids will cause the control valve to admit air to the closing cylinders and energization of the other will release this air to cause contact separation.

It is therefore an object of my invention to provide a single pole circuit breaker of simple construction which opens its contacts at an extremely high speed and may be closed by pneumatic, electrical or mechanical means.

Another object of my invention is to provide a novel mounting means for combining a plurality of individual single pole breakers to provide a unitary multipole structure.

Still another object of my invention is to provide a multipole circuit breaker wherein the contacts of one pole may operate independently of the contacts of the associated poles.

A further object of my invention is to provide a circuit breaker wherein contact engagement is caused and maintained by pneumatic electrical or mechanical means and contact separation by resilient means.

A still further object of my invention is to provide a multipole circuit breaker having individual poles interlocked so that automatic or manual tripping of a single pole will cause the tripping of all of the associated poles.

Another object of my invention is to provide a multipole circuit breaker which is formed by assembling a plurality of single pole circuit breakers interlocked by means of a common compressed air manifold.

It is a further object of my invention to provide a multipole circuit breaker formed of individual circuit breaker poles and interlocked by a compressed air manifold, the tripping of which is controlled by an electrically or manually operated valve.

These and other objects of my invention will become apparent from the following specification taken in connection with the accompanying drawings, in which.

Figure 1:
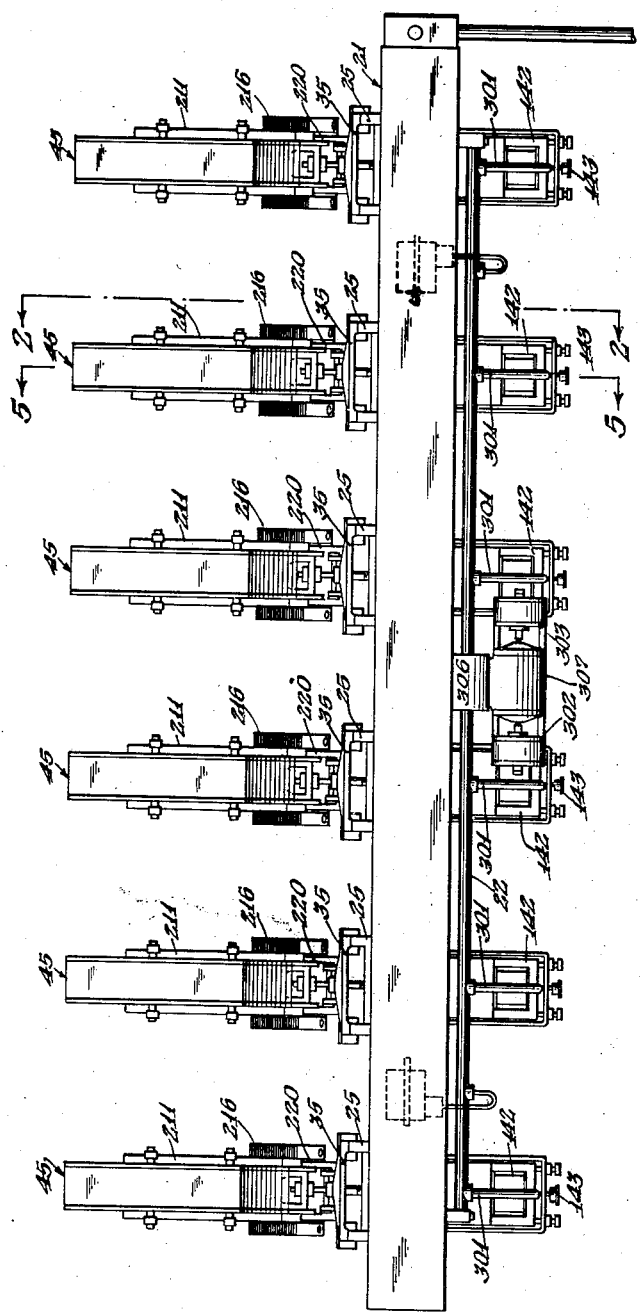
Figure 1 is a front view of the multi-pole circuit breaker and the supporting means therefor.

As illustrated in Figure 1, the circuit breaker is built upon a unit pole basis and any number may be assembled to form a multi-pole breaker. A six-pole breaker is illustrated in Figure 1, the individual poles being supported upon a common frame 21, and operated from a central pneumatic means through compressed air manifold 22.

Figure 2:
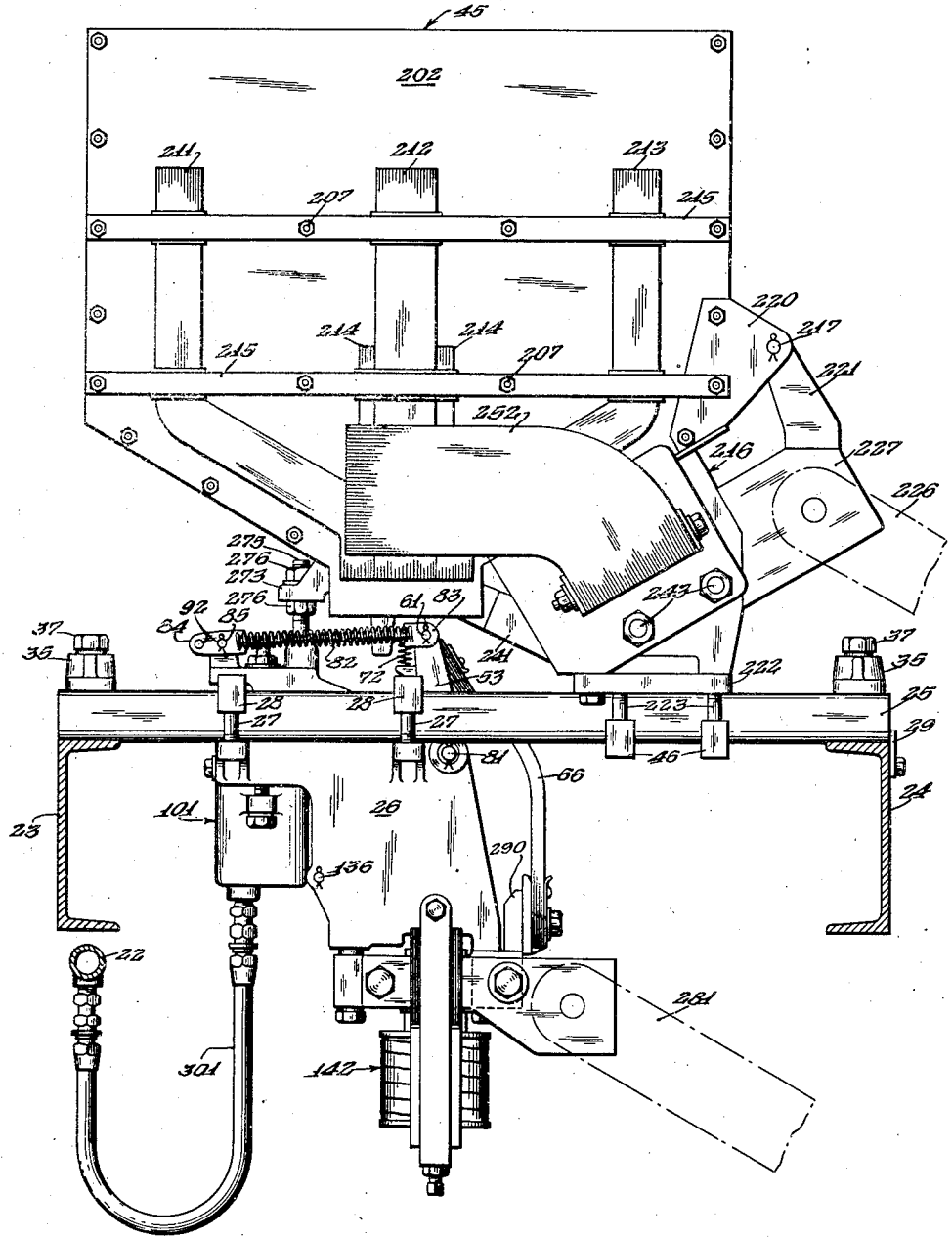
Figure 2 is a side view of one of the units taken along the line 2—2 of Figure 1.
Figure 5:
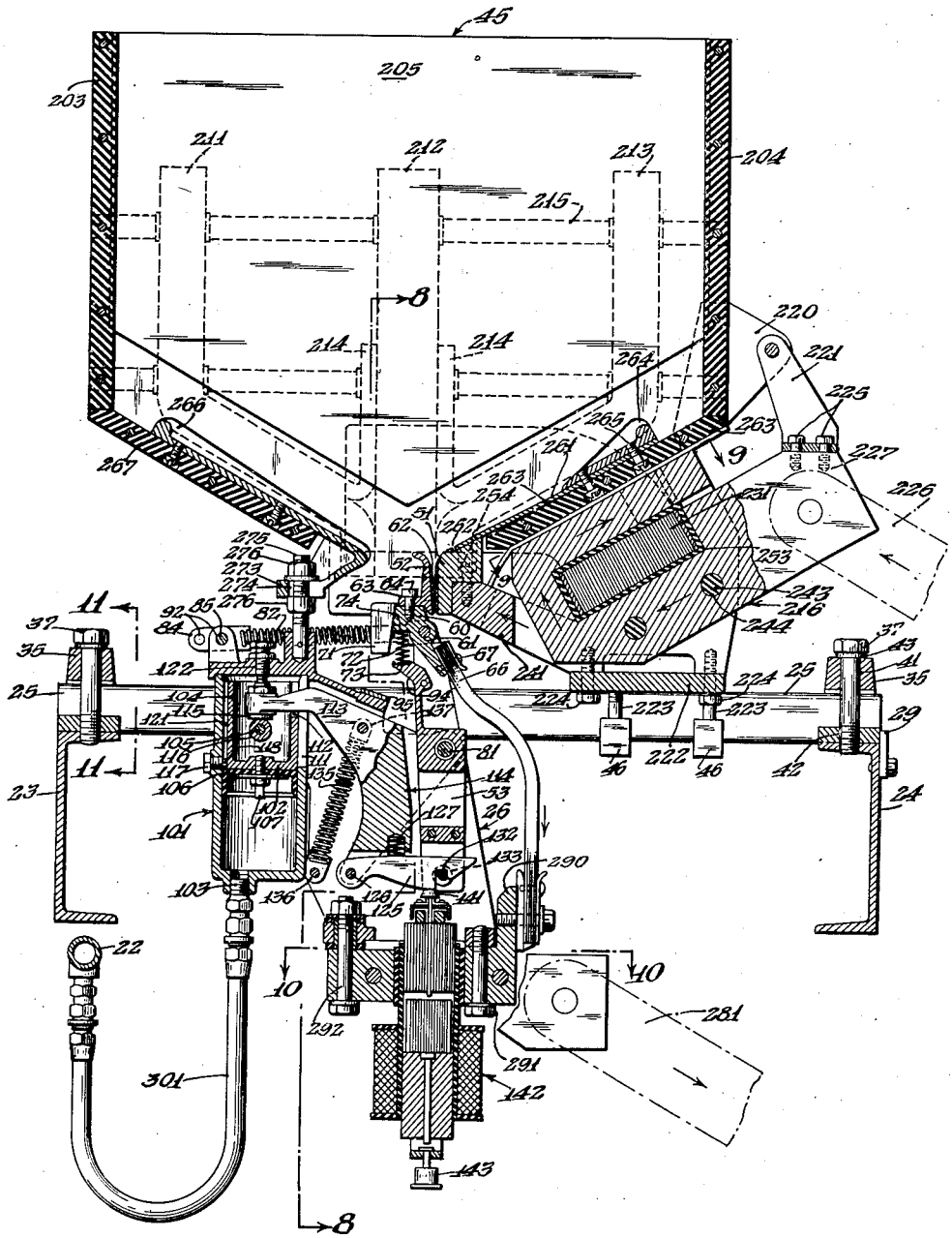
Figure 5 is a cross-sectional view of one of the units taken along the line 5—5 of Figure 1. The contacts are illustrated in the closed position.

The main frame 21 as is more particularly illustrated in Figures 2 and 5 comprises a pair of parallel channels 23 and 24 which may be supported in any suitable manner. The individual circuit breaker poles are supported between these two channels by means of a plurality of parallel cross bars 25 which extend between the two channel members and are detachably secured thereto.

Figure 8:
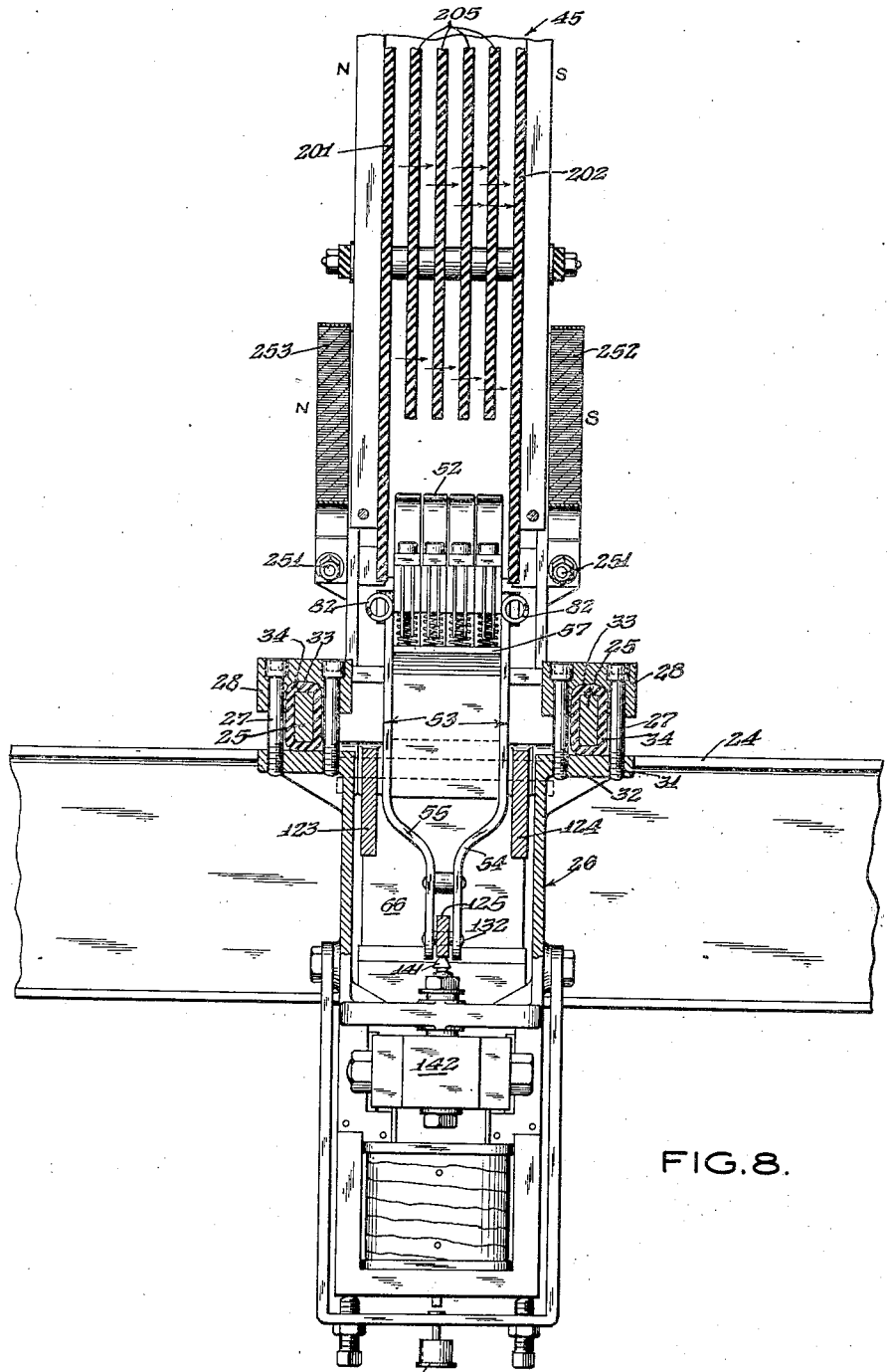
Figure 8 is an end sectional view of one of the circuit breaker units taken along the line 8—8 of Figure 5.

A main U-shaped metallic structure 26 carries the individual circuit breaker operating elements and is in turn supported by two of the parallel cross-bars 25, as is more clearly illustrated in Figures 2 and 8. The U-shaped member 26 is fixed to the cross-bars 25 by means of a plurality of screws 27 which pass through metallic blocks 28 and engage in corresponding, the threaded perforations 31 in a plurality of lugs 32. These lugs are preferably reinforced integral extensions of the walls of the U-shaped member 26.

The metallic blocks 28 are recessed at 33 to correspond with the periphery of the cross-bars 25, which are surfaced with an insulating material 34 in order to preclude short circuiting of the various conductive elements supported thereupon and to isolate the circuit breaker elements from the ground potential of the frame.

Figure 11:
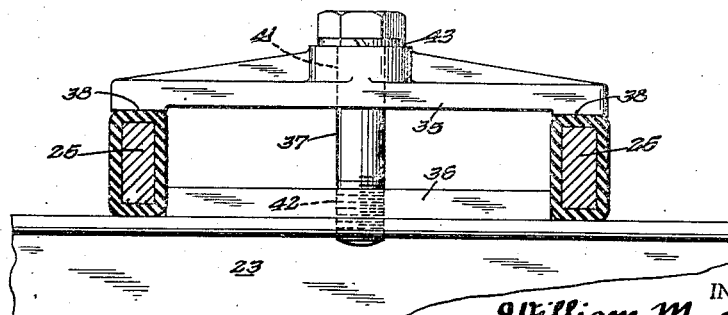
Figure 11 is a cross-sectional view of the circuit breaker mounting means taken along the line 11—11 of Figure 5.

Each pair of cross-bars 25 and its associated circuit breaker pole is secured to the parallel channels 23 and 24 by a pair of clamping members 35 one of which is most clearly illustrated in Figure 11. This clamp constitutes a ribbed main portion extending parallel to upper flange of the channel with which it is respectively associated, and a pair of end extensions 38 which are arranged to press down upon the upper surfaces of the cross-bars.

A metal plate 29 secured to the web of channel 24, projects above the upper flange thereof and serves to locate the ends of the cross-bars 25 during assembly. Also, a plurality of locating plates 36 of length equal to the distance between the two parallel cross-bars, are fixed to the channels to expedite uniform spacing of the individual circuit breaker poles. The required pressure between the cross-bars and the upper flange of the channel is obtained by an appropriate bolt 37 which freely passes through a central perforation 41 in the clamp 35 and engages in a corresponding threaded perforation 42 in the plate 36 and the flange of the channel member.

Thus by tightening bolt 37 against the lock washer 43 the clamp is brought to bear against the cross-bars and so secures each circuit breaker to the frame.

This type of circuit breaker mounting greatly facilitates the removal of the individual poles for repair and the subsequent assembly thereof. A single circuit breaker pole may be removed without disturbing the associated units by loosening the pair of clamps 35 associated therewith and removing the entire assembly by means of the two parallel cross-bars 25.

The mounting of each circuit breaker pole assembly comprises positioning the pair of parallel cross-bars 25 by means of the plates 29 and 36 and tightening the bolts 37. Furthermore, the circuit breaker elements may be disassembled and reassembled without necessarily removing the complete circuit breaker structure from the parallel channels 23 and 24. Thus, by loosening the bolts 27 the U-shaped member 26 and the operating mechanism associated therewith, may be removed.

Figure 3:
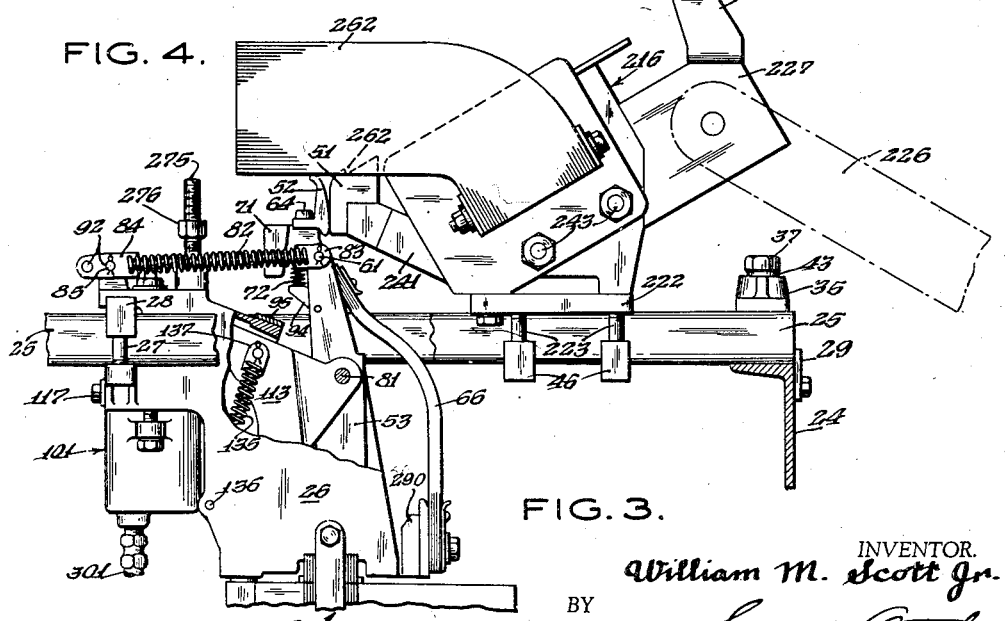
Figure 3 is a fragmentary side view of one of the circuit breaker units illustrating the arc quencher in its raised position.

An arc quenching unit 45, preferably of the magnetic blow out type, is provided for each of the circuit breaker poles. It is mounted upon the stationary contact and blow out coil assembly which is supported upon the insulated cross-bars 25 by means of metallic blocks 46 similar to the blocks 28 as will hereinafter be more completely described. The arc quenching unit may be raised as illustrated in Figure 3 but during normal operation is in the lowered position as illustrated in Figure 5, when it is secured to the U shaped frame 26.

Associated with the arcing chamber is a stationary contact 51 which is engageable by a plurality of complementary movable contacts 52 as illustrated in Figures 3, 5, 6, 7 and 8. The movable contacts 52 are supported upon a contact carrying member 53 which comprises, as is illustrated in Figure 8, a pair of side members 54 and 55 maintained in spaced relationship by means of a spacer 56 at the base and by means of a cross-member 57 at the upper end thereof.

The plurality of movable contacts 52 are each supported upon an individual member 60, which members are in turn pivotally mounted upon a shaft 61. The shaft 61 passes between corresponding aligned perforations in the side members 54 and 55 of the contact carrying arm.

The movable contacts 52 are angular members having a contacting surface 62 and a supporting flange 63 through which a plurality of screws 64 pass and secure the contacts to the pivoted contact carrying members 60. Each contact carrying member 60 is provided with an extension 65 to which a flexible conductor 66 may be secured in any manner, as for instance, by the rivet 67.

In order to minimize the time required for circuit interruption, all of the movable members employed are made as light as possible. This necessitates a reduction in the cross-sectional area of the conductors, and consequently, there is an increase in the generation of heat.

Therefore, vertical vanes 71, preferably made of light and highly conductive metal such as aluminum are fixed upon the contact carrying members 60 in order to provide a greater cooling surface and thus decrease the rate of contact deterioration.

Figure 6:
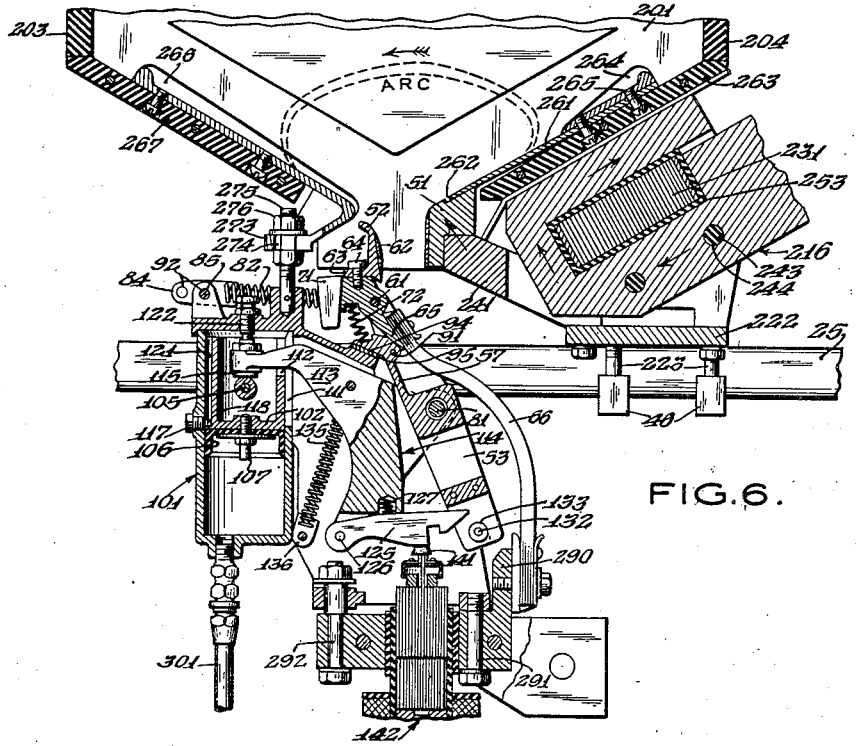
Figure 6 is a fragmentary cross-sectional view corresponding to a portion of Figure 5 and showing the contacts immediately after tripping.
Figure 7:
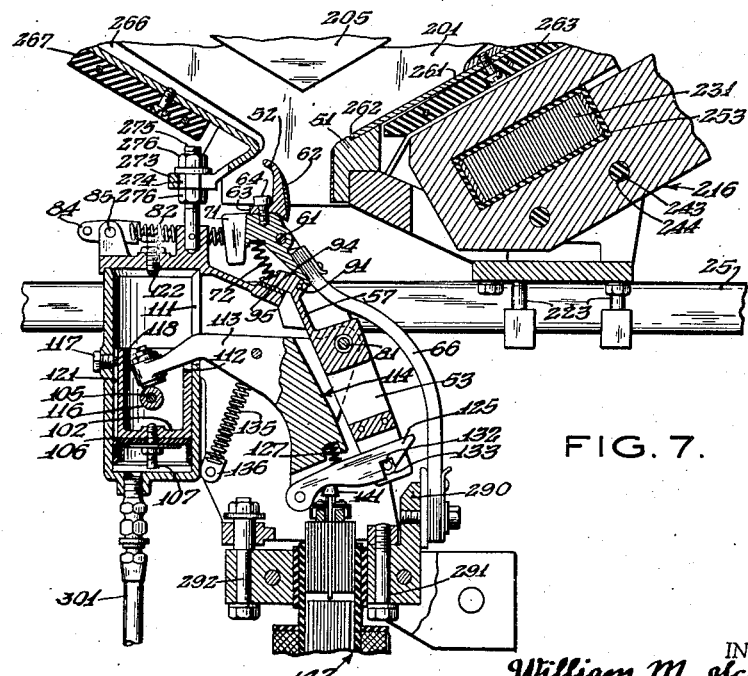
Figure 7 is a fragmentary cross-sectional view of one of the units corresponding to a portion of Figure 5 and showing the latch and contacts in their final open or reset position.

Compression springs 72 supported within recesses 73 in the cross-member 57 of the contact operating arm and recesses 74 in each of the contact carrying members 60 bias the movable contacts 52 in a clockwise direction about shaft 61, when viewed as in Figures 5, 6 and 7.

The stationary contact 51 which is supported within the arc quenching structure is a single member of length equal to the sum of the lengths of all of the movable contacts.

The multiplicity of movable contacts, each biased by an individual compression spring 72 is provided in order that effective low resistance engagement between the stationary and movable contacts may at all times be obtained.

Thus is due to the high temperature arcs which may be drawn between the contacts high spots or other similar deformations are formed upon either the stationary contact or any one of the movable contacts, the remaining movable contacts will still maintain an effective low resistance path therebetween.

The contact carrying arm 53 is supported and pivotally mounted upon the shaft 81 which in turn is secured to the side walls of the U shaped frame 26. The arm 53 and its associated movable contacts 52 are continuously biased towards the open circuit position by means of a pair of tension springs 82 which are carried between supports 83 and 84 that are pivotally mounted upon the shafts 61 and 85 respectively as is more clearly illustrated in Figures 3 and 8.

The open circuit position of the contacts is most clearly illustrated in Figure 7. It may be seen that the individual movable contacts 52 have been rotated with respect to shaft 61 by means of compression spring 72 so that the flat extensions 65 of the contact carrying members are in surface engagement with a projection 91 of the cross member 57. This projection serves to limit the maximum rotation of the individual contacts.

The tension springs 82 still exert a force upon the contact carrying arm and thus maintain the contacts 52 in the open circuit position. As illustrated, the pivoted support for each end of the tension springs 82 permits freedom of motion, and the tension of spring 82 may be adjusted by pivoting the support 84 upon shaft 85 through any one of a plurality of perforations 92.

The open circuit position of the contact carrying arm 53 is determined by engagement between surface 94 of the cross member 57 and a contact buffer or resilient, shock absorbing member 95 which is fixed to the frame of the circuit breaker.

By rotating the arm 53 in a clockwise manner as viewed in Figure 7, engagement between contacts 52 and 51 is obtained. As a result, however, of the previous clockwise rotation of contacts 52 about shaft 61 under the influence of the compression springs 72, contact will first be established between the upper portions of contacts 52 and 51. Continued clockwise rotation of the contact carrying arm 53, however, will cause the movable contacts to yield against the action of compression springs 72 and rotate about the pivot 61. Obviously this will cause a wiping action between the surfaces of these contacts, and when rotation of arm 53 is complete, surface engagement will be established over the lower areas of both movable and stationary contacts 52 and 51 as illustrated in Figures 3 and 5.

Conversely, counterclockwise rotation of the contact carrying arm 53 during circuit interruption will cause surface engagement to be transferred first from the lower areas to the upper areas of the contact faces prior to the actual disengagement between the two surfaces.

Thus it may be seen that contact will first be established by engagement of the upper portions of the contacts and circuit openings will occur over a similar portion thereof. Therefore, for most effective operation, each of the contacts may be faced with two bands of metal as illustrated in Figure 5. The lower portions of the contacts may be faced with a highly conductive material such as silver and the upper portions thereof may be faced with an arc resistant material such as silver-graphite or silver-tungsten alloy.

Circuit breaker closures are effected by pneumatic means mounted upon the main supporting structure. As illustrated, most clearly in Figures 5, 6, and 7, a compressed air cylinder 101 is supported upon the circuit breaker frame and houses a piston 102 which is operated by means of compressed air delivered through the port 103. The cylinder head is an integral part of the U shaped frame 26.

A cylindrical skirt 104 which is an integral portion of the piston 102 is in slidable relation with the interior of the cylinder 101 and carries a rod 105 between the walls thereof. A cup shaped packing member 106 is utilized to preclude air leakage and a bolt 107, which secures the packing to the piston 102 serves as a stop to limit the downward movement thereof.

The cylinder 101 and its associated skirt 104 are slotted at 111 and 112 respectively so that a flat extension 113 of the contact closing lever 114 may communicate with the interior of the cylinder. A projection 115 of the arm 113 rests upon an unrestrained roller 116 which is supported upon the shaft 105 within the skirt 104.

The slots 111 and 112 are maintained in alignment by means of a bolt 117 which has an unthreaded portion 118 of reduced diameter that engages an axial groove 121 within the wall of the skirt 104. The upward movement of the arm 113 and thus the piston and its associated skirt is limited by means of a stop 122 in the form of a bolt which projects through the cylinder head.

The lever 114 comprises the flat portion 113 and a pair of integral parallel side members 123 and 124, as is illustrated in Figure 8, spaced upon a widened part of the arm 114. These parallel members contain aligned perforations 129 (see Figures 6 and 8) and the lever 114 is thereby rotatably supported upon the shaft 81, which as previously described, also supports the contact carrying arm 53.

A latch 125 is pivotally supported within a bifurcated lower portion of the lever 114 by means of pin 126 and is continuously biased towards clockwise rotation about pin 126 by means of a compression spring 127 which is retained in a recess 128 in the lever 114. The latch 125 has a sloping surface 131 so that it may ride smoothly over a pin 132 which is rotatably supported within ball bearings 133 recessed into the side members 54 and 55 of the contact carrying arm 53.

A notch 134 in the latch 125 is engageable with the pin 132 as illustrated in Figure 5. It may be observed that if the lever 114 is fixed in the position indicated in Figure 5 (by air pressure in the lower section of the cylinder 101), and if the notch 134 is in engagement with the pin 132, then the contacts will be fully engaged, against the normal action of springs 82.

A pair of tension springs 135 are carried between the supports 136 and 137 which are pivotally mounted upon the frame of the circuit breaker and the lever 114 respectively. These tension springs 135 are arranged to bias the lever 114 to counterclockwise rotation about shaft 81 when viewed as in Figure 5. Accordingly the extension 115 of the arm 113 continuously biases the piston 102 downwardly as viewed in Figure 5.

If the latch 125 is rotated in a counterclockwise direction about pivot 126 when viewed as in Figure 5, to disengage the pin 132, the contact carrying arm 53 will be free to move under the influence of tension springs 82 and will thus be rapidly displaced to the open circuit position which is determined by contact buffer 95 as illustrated in Figure 6.

If now the force which maintains piston 102 in the raised position against the force which is transmitted thereto from spring 135 by means of arm 113, that is, if air pressure existing within the lower portion of cylinder 101 is released, then the lever 114 will rotate about pivot 81 under the influence of spring 135 to the position illustrated in Figure 7.

However, in moving from the position illustrated in Figure 6 to that illustrated in Figure 7, the edge 131 of the latch will ride over the pin 132 and cause the engagement therebetween as illustrated in Figure 7. The contacts therefore may now be reclosed by introducing air under pressure through the port 103 into the lower portion of the cylinder. This will cause the piston to rise which will correspondingly rotate the lever arm 114 about the pivot 81, and inasmuch as the pin 132 is captured within the notch 134, this movement of lever arm 114 will cause rotation of contact arm 53 and contact engagement as illustrated in Figure 5.

The latch 125 may be actuated by means of a plunger 141 which is part of the tripping unit 142. This plunger may be operated automatically under fault conditions which will hereinafter be described, or may be operated manually by raising the plunger knob 143. Thus when the contacts are in the position illustrated in Figure 5, circuit interruption may be obtained by manually or automatically causing the operation of plunger 141.

As previously described, this will result in the contact moving to the position illustrated in Figure 6. Since it is desirable to place the breaker in condition for immediate reclosure, means must necessarily be provided for releasing the air contained within the lower portion of cylinder 101 after the circuit interruption. Upon release of air pressure from the cylinder, the springs 135 cause the piston to assume the position illustrated in Figure 7 and permits the latch to recapture the pin 132 of the contact carrying arm 53.

The control system will be described in a later paragraph.

The trip unit 142 may comprise any of the well known solenoid or similar electromagnetic devices for actuating a plunger such as 141 to raise the latch upon fault current. For certain applications, the trip unit may be arranged to cause circuit interruption for relatively low values of reverse current and relatively high values of forward current, according to the particular application thereof.

It may be seen that the individual circuit breaker poles and the operating mechanism associated therewith are entirely trip free. Thus, assume the contacts to be in the position illustrated in Figure 7 and assume that it is desired to close the circuit breaker. The introduction of compressed air of any fluid under pressure into the lower portion of cylinder 101 will cause the clockwise rotation of lever 114 and accordingly clockwise rotation of contact carrying arm 53, the force required therefor being transmitted through the latch 125.

If a fault occurs during the engagement of the contacts 52 and 51, the trip unit will instantaneously be energized to raise the latch 125. This will immediately cause the disengagement of contact carrying arm 53 from lever 114 and permit rapid return to the open circuit position as illustrated in Figure 6, despite the fact that air may still be allowed to enter into the cylinder 101.

When the circuit breaker operating mechanism is in the position illustrated in Figure 5, the tension springs 82 and the tension spring 135 all exert a force upon the members which tends to rotate the contact carrying arm to the open circuit position.

Tripping, as has hereinabove been described may be accomplished by raising the latch 125. The contact carrying arm 53 will then be displaced to the open circuit position under the influence of springs 82. However, tripping may also be accomplished by releasing the air contained within cylinder 101. Under these circumstances, the contact carrying arm will again be displaced towards the open circuit position under the influence of tension springs 82. Also, the combined effort of the springs 82 and 135 accelerate the downward motion of the piston and increase the rate at which air is exhausted from the cylinder.

Should any faul develop in the air lines, then the consequent decrease in the air pressure within the cylinder will result in the opening of the circuit breaker.

Figure 4:
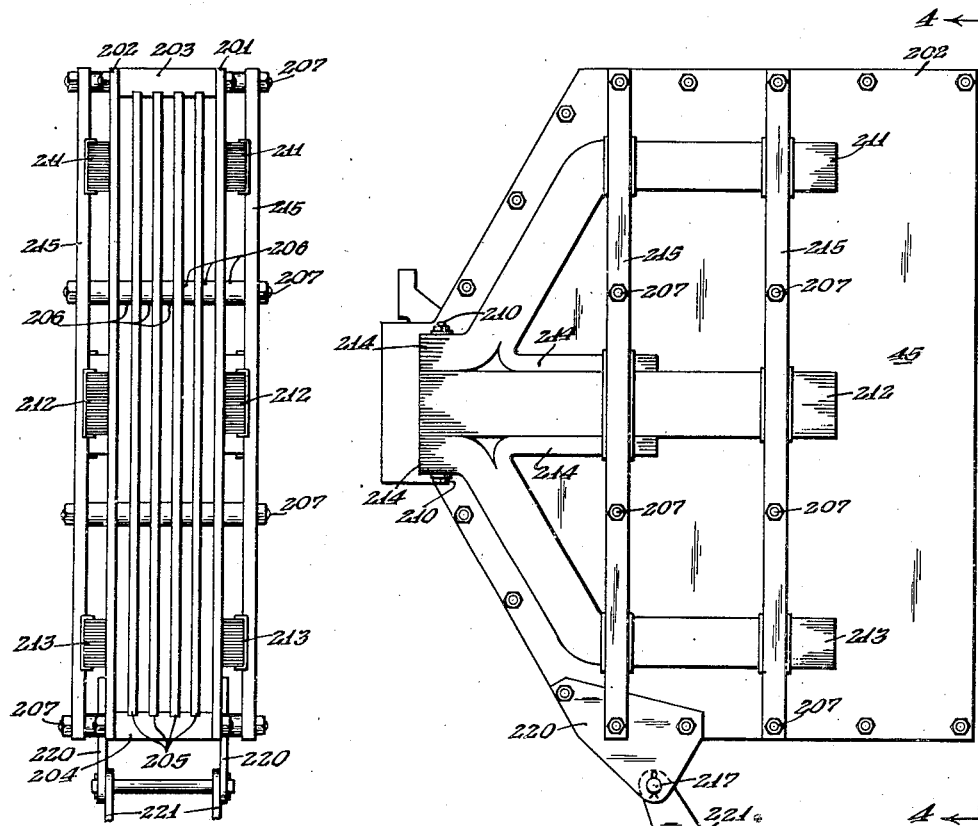
Figure 4 is a top view of the arc quenching unit taken along line 4—4 of Figure 3.

The arc quencher 45 as illustrated is of the well known magnetic blow out type. Essentially this structure comprises a pair of parallel insulating plates 201 and 202 as illustrated in Figures 4 and 8, spaced by the end insulating members 203 and 204. Within the box like structure formed thereby are a plurality of parallel insulating plates 205 in spaced relation with each other which form a plurality of flues exhausting to the atmosphere through the open top of the arc quencher. The parallel insulating plates 205 are separated by spacers 206 which are in turn supported by means of the bolts 207 which pass through the arc quencher.

Mounted upon the sides of the arc quenching structure are a plurality of magnetizable members 211, and 213 formed from some laminated material and each communicating with and connected to a central magnetic member 212 by means of the bolts 210 passing through extensions 214. The magnetic members 211 and 213 are positioned against the side insulating plates 201 and 202 by means of a plurality of straps 215 fastened thereto by the bolts 207, which as previously mentioned serve also to space the plates 205.

The entire structure is pivotally mounted, by means of a pair of plates 220, which are secured to the walls of the arc quenching structure as illustrated in Figures 3 and 4, upon a shaft 217 which in turn is supported by means of the metallic brace 221. (This brace is fastened as illustrated in Figure 5 to one section of the coil 216 by means of the bolts 225.)

The magnetic members 211—213 are magnetically energized by means of a coil 216 which is supported upon the insulated cross bars 25. Thus, as is illustrated in Figures 5, 6 and 7, a plate 222 is secured to the cross bars 25 by means of clamping blocks 46 and associated bolts 223 in a manner similar to the mounting for the U-shaped frame 26. This plate contains additional perforations for permitting the attachment of the coil 216 by means of bolts 224 which pass into tapped holes in the coil members.

Figure 9:
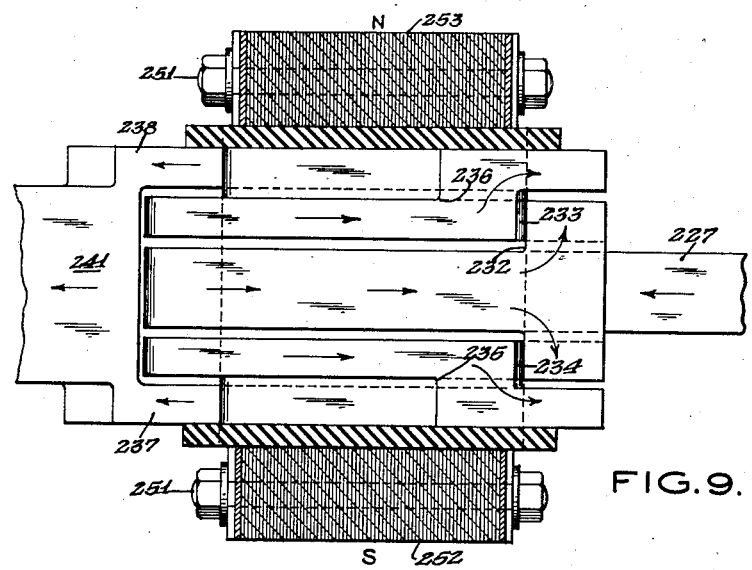
Figure 9 is a fragmentary cross-sectional view of the magnetic blow out coil taken along line 9—9 of Figure 5.

The coil 216 is a double turn of copper of rectangular cross section through which the line current flows. Thus, as illustrated in Figures 5 and 9, the current enters from the bus bar 226 which is fastened directly to one section 227 of the coil 216. This section 227 passes completely around a rectangular magnetic core 231 and then branches out at 232 into two parallel sections 233 and 234 which again pass around the core 231. Each of these two sections then branches out again at 235 and 236 into two additional sections 237 and 238 and upon completing their half circuit about the core are joined together at 241.

This novel arrangement thus provides the equivalent of two complete turns about the magnetic core 231. The individual turns of the coil are braced by the insulating bolts 243 which pass through aligned perforations 244.

The core 231 as is more clearly illustrated in Figures 1, 2, 3 and 8 is formed from a series of stacked rectangular laminations of some magnetic material such as soft iron clamped together by means of the bolts 251.

These laminations are stacked with their poles to form a U-shaped magnet having the two side members 252 and 253 extending from the central core 231. These side members as illustrated come into close frictional contact with the central magnetic structure 212 supported upon the sides of the arcing chamber.

Thus when the arcing chamber is lowered, as illustrated in Figure 2, energization of the core 231 by the line current flowing through the coil 216 will cause the magnetization of all of the members 211, 212, 213 which are strapped to the sides of the arcing chamber to produce a transverse magnetic field across the arc chamber.

The magnetic core 231 is wrapped with an insulating material 253 to preclude the short circuiting of the turns of the coils 216.

The coil 216 terminates in the extension 241, and as indicated in Figures 5, 6 and 7, the stationary contact 51 is supported thereupon by means of a plurality of bolts 254 which pass through countersunk perforations therein and engage correspondingly threaded perforations in the extension 241.

A plurality of projections 255 and 256 are provided upon the coil 216 in order to properly position the coil and the attached arcing chamber upon the plate 222.

The material utilized for the coil is preferably a highly conductive one such as copper, the cross-sectional area of which is selected to carry normal load currents at standard temperature rise. The coil is braced to withstand the mechanical stresses imposed thereon by the weight of the arc chute, and those imposed during the flow of fault currents.

A conductive arcing plate 261 of resilient material, extends along the lower insulating plate 263 of the arc chute and is fastened thereto by means of the screws 265, which also secure the replaceable arcing horn 264. When the arc chute is in normal position as indicated in Figure 5, the plate 261 is sprung away from the insulating plate and presses against the stationary contact 51 within a recess 262. This pressure ensures low resistance engagement between the conductive members to provide for the flow of the arcing current.

This arrangement permits the pivoting of the arc chute when necessary and the flow of arcing current when the arc chute is in its normal position.

The flexible conductor 66, joined at one end to the movable contacts, is electrically connected, at the other end, to the trip coil and to the main frame 26.

Figure 10:
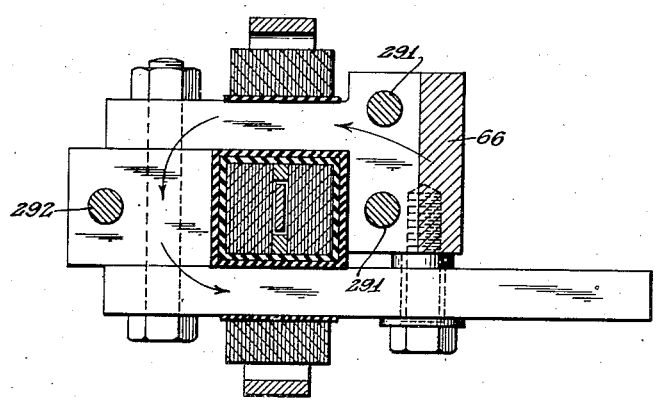
Figure 10 is a top cross-sectional view of the automatic trip unit taken along line 10—10 of Figure 5.

The trip coil may comprise, as seen in Figures 5 and 10, a single turn of copper about a control magnetic member. The flexible conductor 66 is fastened to the coil upon the integral projection 290 at one end, and the bus bar 281 is joined to the other end. The uninsulated bolts 291 passing through perforations in the trip coil fix the coil to the main frame 26 and thereby maintain this frame at the potential of the movable contact. Additional support is provided for the coil by bolt 292. However, this bolt is insulated from the frame as shown in Figure 5, to preclude the short circuiting of the trip coil.

A secondary complementary metal arcing horn 266 is disposed upon the lower insulating plate 267 and the lower edge 271 thereof is arranged to be adjacent the end 272 of the movable contact 52 when the contact is in the open position as is best illustrated in Figure 7.

An integral projection 273 of the arcing horn 266 is perforated at 274 and is engageable with a stud 275 which is mounted upon the main frame 26 of the circuit breaker. A pair of adjustable nuts 276 provide means for positioning and securely clamping projection 273 to the main frame through stud 275.

This extension 273 which is fixed to the arc quenching unit therefore provides means for locking the arc quencher to the main frame. Also since it is metallic and is mechanically and electrically connected to the main frame of the circuit breaker it is at the potential of the movable contact. It is therefore possible to transfer the arc drawn during circuit interruption from movable contact to the lower portion 271 of the metallic arcing horn 266.

The current entering at bus bar 226 flows through coil 216 and through the integral extension 241. The current then passes through the engaged contacts and through the flexible conductor 66 and through the tripping unit 142 and leaves the circuit breaker by means of bus bar 281.

As is illustrated in Figure 5, the central portion 212 of the magnetic members which are supported upon the side walls of the arc chute are disposed in the vicinity of the contacts, when the arc chute is lowered.

The polarity of the magnetized members (due to the line current flowing through the coil) is arranged so that the transverse magnetic field passing through the arcing chamber will act upon arcs drawn between the contacts in a manner which will force them up into the chamber; the arc terminals travelling along the metallic sheets 261 and 266. The arc chute acts in the well known manner to attenuate and quench arcs drawn between the contacts and transferred to the arcing horns.

In order to inspect the contacts, the upper of the two nuts 276 is removed and the entire arc chute is swung back about its pivot 217 to the position indicated in Figure 3. This exposes as is seen in Figure 3, both the stationary and movable contacts and thus greatly facilitates cleaning and replacement thereof.

Control system

As previously described, circuit closures are effected by means of the piston 102 operating in cylinder 101 by compressed air delivered from an air storage means.

The air is delivered to the cylinder 101 through the insulated pipe 301, suitably connected thereto, and through an electrically controlled valve interposed between the air supply and the operating cylinders.

Figure 12:
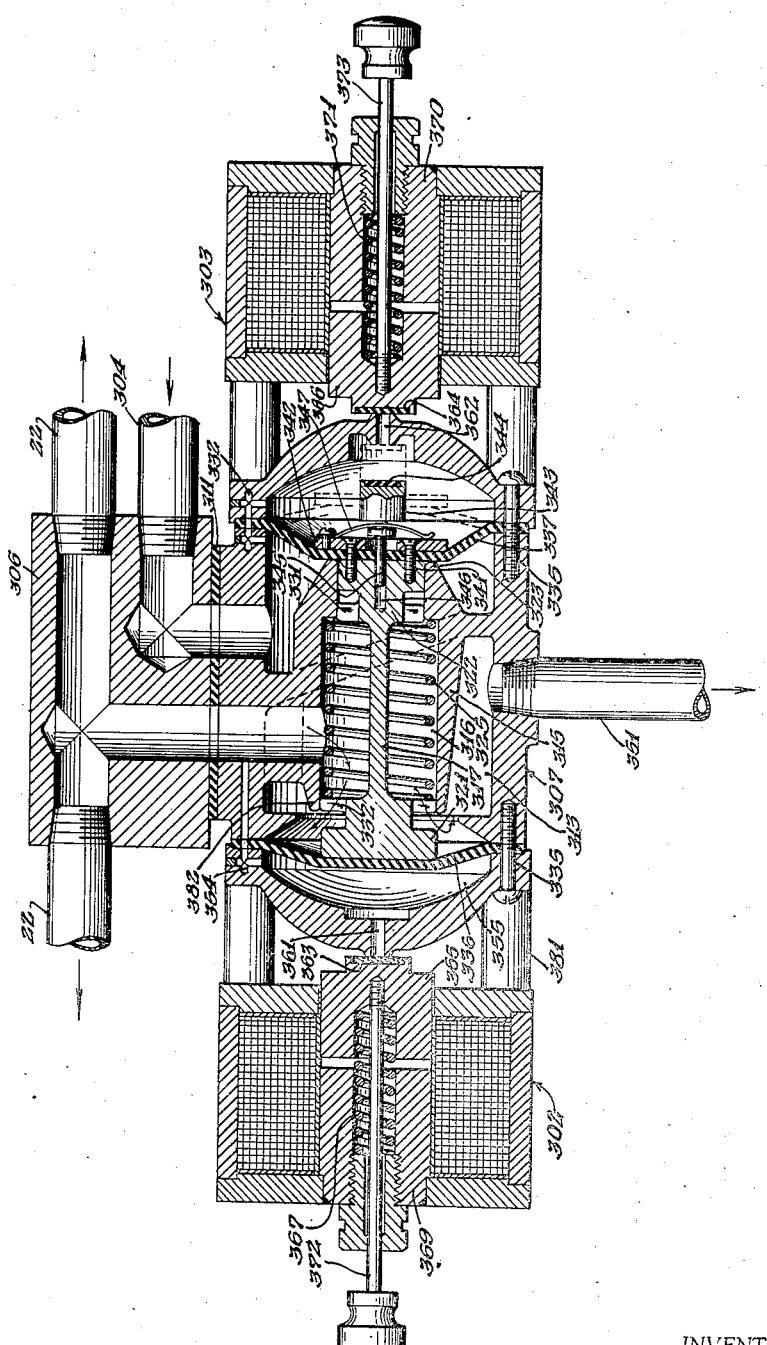
Figure 12 is a cross-sectional view of the pneumatic operating means in the position corresponding to the circuit breaker open circuit position.
Figure 13:
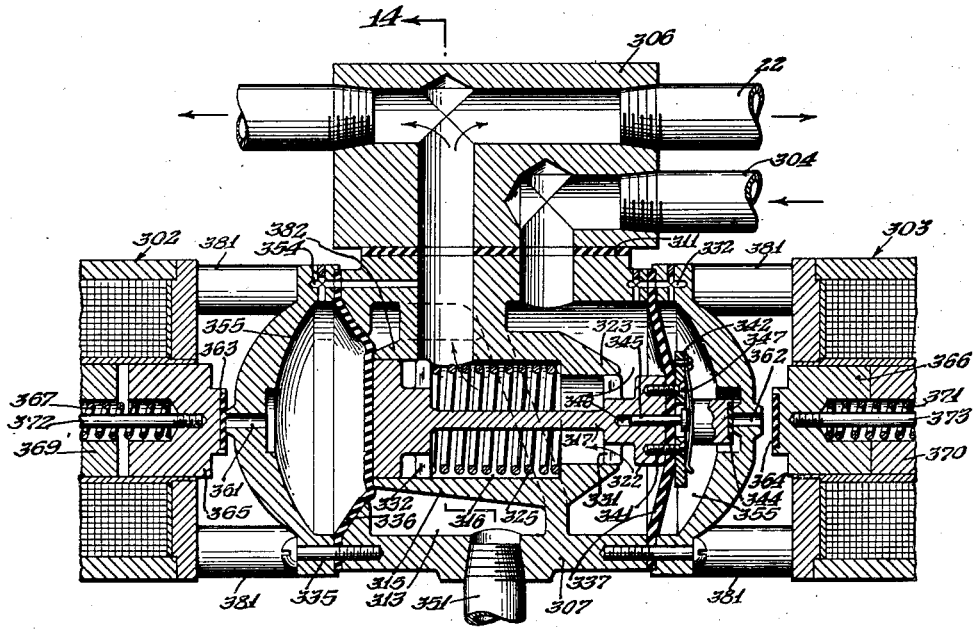
Fig. 13 is a cross-sectional view of the pneumatic operating means corresponding to the circuit breaker closed position.
Figure 14:
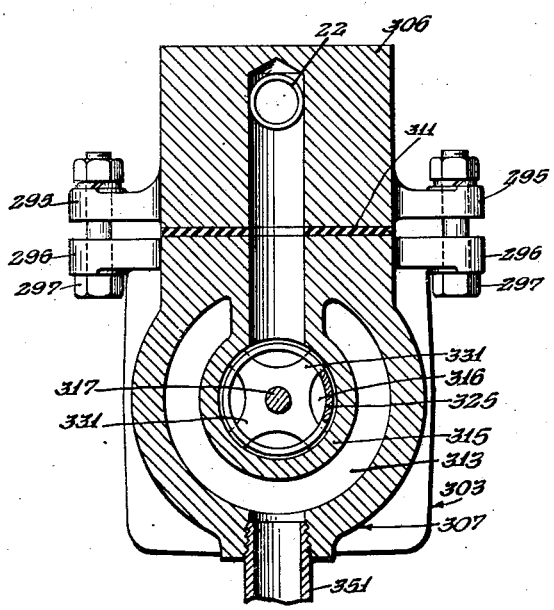
Figure 14 is an end cross-sectional view of the pneumatic operating means taken along the line 14—14 of Figure 13.

The control valve which is most clearly illustrated in Figures 12, 13 and 14 is operated by a pair of oppositely disposed solenoids; that is, trip solenoid 302 and closing solenoid 303.

Compressed air from the storage means enters the control valve through pipe 304 and flows to and from the operating cylinder through the manifold 22. These pipes 304 and 22 are secured to the valve by means of a block 306 suitably perforated which, in turn, is supported upon the main circuit breaker frame, as illustrated in Figure 1.

The control valve comprises a cylindrical body portion 307 which is secured to the block 306 by a plurality of bolts 297 which pass through corresponding lugs 295 on either side of the block 306 and the cylindrical body 307 respectively. A gasket 211 is interposed between these members to prevent air leakage thereat.

The cylindrical member 307 is cored to produce annular air chambers 312 and 313 which are separated by means of a integrally cast partition 314. Supported upon the partition, is another hollow cylindrical member 315 which is bored out to afford a passage 316 between the two annular chambers 312 and 313.

Operable within the cylinder 316 is a spool-shaped member 317 which essentially comprises a central portion of narrow diameter and two pistons 321 and 322 which are operable along the inner surface thereof.

The end 323 of the inner cylindrical member is of smaller diameter than the opposite end thereof in order to provide an abutment 324 for a compression spring 325 which constantly exerts a force on piston 321 towards the left as viewed in Figures 12 and 13.

Adjacent the pistons, as indicated more particularly in Figure 14, are star-shaped elements 331 and 332 as indicated in Figure 14, which maintain alignment when the pistons are displaced beyond the ends of the passage; while permitting air to flow therethrough.

The open ends of the main cylindrical member 307 are sealed by a pair of flexible diaphragm valves 337 and 336 firmly secured thereto by a corresponding pair of dome shaped circular members 333 and 334, fastened to the main structure by any suitable means as for example screws 335.

The diaphragm 336 is free of the piston 321 whereas the diaphragm 337 is attached by means of screws 341 and metal plate 342 to the piston 322. In addition, piston 322 also carries a cylindrical member 343 which is faced with a layer of valve seat material 344.

This cylindrical member 343 is preferably fixed to a rod 345 which is slidable within a corresponding perforation 346 within the piston 322 and is constantly biased from the diaphragm 337 by means of leaf spring 347 which accordingly serves as a shock absorber during closures of valve 344, as will be described.

As illustrated in Figures 12 and 13, the circuit breaker closing manifold 22 enters into the cylinder 316 which is supported by partition 314. Air is exhausted from the control valve through annular passage 313 and the exhast pipe 351 connected thereto. When the control system valves are arranged as illustrated in Figure 12, the circuit breaker air cylinders 141 are at atmospheric pressure and the contacts are in the open circuit position as in Figure 7.

The air in annular passage 312 is at the pressure of the supply system, and thus the left face of diaphragm 337 is acted upon by a corresponding force.

However, as illustrated, a small passage 352 interconnects the dome 353 and the annular chamber 312, thus equalizing the unit pressures on the faces of diaphragm 337.

Since the high pressure air in annular space 312 acts upon an annular area whereas high pressure air within the space 333 acts upon a full circular area of equal outer diameter, the diaphragm valve 337 is displaced to the left (the maximum displacement being indicated in Figure 12). The spring 325, as may also be seen, acting upon the spool shaped member 317, adds to the force which draws diaphragm 337 in this direction.

When the valve diaphragms are in the position indicated, the circuit breaker operating cylinders 101 are vented through insulating pipe 301 and through pipe 22 which leads to the cylindrical passage 316. The air is then free to flow from this passage through the star-shaped element 332 into the annular passage 313 and thus to the atmosphere through the exhaust pipe 351.

Pressures on the opposite faces of diaphragm 336 are equalized through small passage 354 which interconnects the manifold 22 and the dome-shaped space 355.

Fine strainers are preferably introduced into the auxiliary equalizing passages 352 and 354 to preclude the entry into the dome of dust or other foreign particles which would cause faulty seating of the valves.

The dome-shaped elements 333 and 334 are centrally perforated at 361 and 362 respectively to form a pair of auxiliary valves which may be sealed by solenoid plungers 365 and 366 surfaced with layers of valve seat material 363 and 364 respectively. These plungers are spring pressed toward their respective valves by compression springs 367 and 371 which are retained within axial recesses in the plunger and in the solenoid stops 369 and 370. The force exerted by the springs must be sufficient to ensure effective valve closures when full supply pressure exists within the dome shaped spaces. Manual operation of the plungers is provided for by plunger rods 372 and 373 tapped into their corresponding plungers and which pass through appropriate centralizing bushings in the solenoid steps.

The coils solenoids 302 and 303 are preferably energized from a control circuit hereinafter described and are supported upon the main valve structure by means of the posts 381.

*Control valve operation*

As previously mentioned, when the valve members are as illustrated in Figure 12, the circuit breaker contacts are open and the manifold 22 is vented through exhaust pipe 351 to the atmosphere.

If the closing solenoid 303 is energized or if the plunger rod 373 is actuated so that the plunger 366 is drawn in against the action of compression spring 371 and bears against its corresponding stop 370, then the passage 362 will vent the dome shaped space 353 to the atmosphere.

Inasmuch as the equalizing air flow through relatively small passage 352 is less than the air flow to the atmosphere through the larger passage 362, the high pressure air within chamber 312 will act to displace diaphragm 337 toward the right when viewed as in Figure 12.

The displacement of diaphragm 337 will accordingly cause the displacement of the attached spool-shaped member 317 and thus piston 322 will move beyond the open end 323 of cylindrical member 313 and permit the high pressure air to enter the circuit breaker manifold through the star-shaped member 331 as is more particularly ilustrated in Figure 13.

Piston 321 will, by virtue of the displacement of the entire member 317, enter the cylinder 315 and block the flow of air from the manifold to the atmosphere through pipe 351.

The increase in pressure within manifold 22 will cause a corresponding increase in pressure in the space 355 due to the equalizing passage 354. Since the right hand face of this diaphragm is obviously at atmospheric pressure, this increase in pressure will act to force and maintain flexible diaphragm 336 against its seat 382 and thus effectively seal the passage 316.

Thus actuation of plunger 366, as hereinabove mentioned, will cause the various operating members to assume the positions illustrated in Figure 13, wherein as indicated by the air flow arrowheads, compressed air from the supply passes through the star-shaped member 331 and enters the circuit breaker manifold 22 and thus causes contact engagement.

The cylindrical member 343 and its associated valve seat 344 will act subsequent to displacement to seal passage 362 against the escape of high pressure air. Subsequent to circuit breaker closure, there will be no tendency for the spool shaped member to return to the position indicated in Figure 12, since the combined forces of the high pressure air acting upon the left surfaces of the diaphragms is substantially greater than the combined forces of the compression spring 325 and the air acting on the right surface of diaphragm 337.

The closing solenoid plunger 366 may be permitted to return to the position indicated in Figure 12 to minimize air leakage through passage 362.

The diaphragm 337 as illustrated in Figure 13 is maintained in a position clear of its seat and thus permits air flow through star-shaped member 331 to compensate for any leakage within the various elements, as for instance, the circuit breaker closing cylinders.

Energization of the trip solenoid 302, or manual actuation of rod 372 to cause the displacement of plunger 365 to the left as viewed in Figures 12 and 13, and will accordingly permit air passage 361 to vent the high pressure air contained within the dome 355 to the atmosphere.

This venting acting will occur at a more rapid rate than the flow of equalizing air from the high pressure manifold through passage 354 and thus the diaphragm 336 will tend to move towards its neutral position.

Therefore, under the influence of spring 325 and the high pressure air, the spool shaped member 317 will correspondingly be displaced and thus will pull the diaphragm 337 against its seat to preclude the further flow of air to the manifold.

This motion of the diaphragm is accelerated by the drop in pressure in the central cylinder 316 which occurs as soon as the air therein exhausts to the atmosphere and the leading edge of piston 322 enters its cylinder.

Thus the control valve members will again assume the position indicated in Figure 12, vent the manifold, and open the circuit breaker contacts.

Following circuit interruption, the plunger 365 may be allowed to close passage 361 as is required for a succeeding circuit closure.

The hereinabove described multipole circuit interrupter and the associated pneumatic control system provide effective means for instantaneously interrupting fault currents flowing in the circuit to which it is connected. However, this form of circuit breaker is particularly advantageous in polyphase circuits wherein a single phase may, upon the occurrence of a fault, be subjected to a current far in excess of the rated value, whereas the other phases may continue to carry a substantially safe current.

This type of fault is commonly found in the operation of polyphase mercury arc rectifiers and is known as a backfire. Upon the establishment of a backfire, the faulty anode is subjected to the current from each of the other anodes and from the rectifier cathode.

Obviously, upon the occurrence of such a fault, it is desirable to have an interrupter in the affected anode circuit open as rapidly as is possible to preclude the destruction of the anode or the transformer feeding the anode. A minimum interrupting time will be obtained if the affected anode breaker pole is permitted to open independently of the unaffected anode breaker poles while automatically energizing a control which will cause the operation of all the breakers, to isolate the circuit.

Thus, if in the multipole circuit breaker illustrated in Figure 1, a fault actuates the tripping unit of a single pole, its latch 125 will be raised and permit the instantaneous opening of its contacts under the influence of tension springs 82. The contact carrying arm is preferably arranged, as previously mentioned, to actuate the pneumatic means to vent the cylinders 191. Accordingly, an auxiliary switch may be supported upon each circuit breaker pole, operable by the contact carrying arm 53. All of the switches are joined in series and are arranged so that the switch contacts are closed when the associated circuit breaker pole is closed.

This series arrangement of switches is in circuit with a relay which is energized when all of the switches are closed. Deenergization of the relay closes contacts thereupon which in turn causes the energization of the tripping solenoid 202 to vent the closing cylinders 191.

Hence, the automatic tripping of a single pole will open a set of contacts in the relay circuit and permit the venting of the manifold 22 and all of the circuit breaker closing cylinders. The release of the compressed air automatically places all the poles of the breaker in condition for reclosure.

Therefore this breaker and associated control system provide means whereby an individual phase of a polyphase network may be opened instantaneously and independently of its associated phases. The same circuit breaker equipment permits the simultaneous closure and interruption of all of the circuit poles.

Since various modifications of the hereinabove described circuit breaker and control system will be evident to those skilled in the art, I prefer to be bound, not by these specific disclosures, but by the scope of the appended claims.

I claim:

1. A single pole circuit interrupter comprising a pair of insulated bars, a first contact secured to said bars, a second complementary contact and operating mechanism therefor, a frame detachably secured to said bars, said frame carrying said second contact and said operating mechanism, and an arc quencher pivotally mounted upon said bars.

2. A single pole circuit interrupter comprising a pair of insulated bars, a winding secured to said bars, and a first contact attached to said winding, a second complementary contact and operating mechanism therefor, a frame for carrying said second contact detachably secured to said bars, and an arc quencher pivotally supported upon said winding.

3. A single pole circuit interrupter comprising a pair of insulated bars, a contact structure detachably secured to said bars, said structure comprising a pivoted contact carrying arm, a first contact at one end of said arm, a pneumatic cylinder and piston, a pivotally supported lever engaged with said piston at one end and carrying a latch at the other end thereof, said latch being engageable with said contact carrying arm, a second contact secured to said bars, a source of compressed air, said piston being operative upon the admission of said compressed air into said cylinder to rotate said lever and said contact carrying arm to cause and maintain contact engagement.

4. A single pole circuit interrupter comprising a pair of insulated bars, a contact structure detachably secured to said bars, said structure comprising a pivoted contact carrying arm, a first contact at one end of said arm, a pneumatic cylinder and piston, a pivotally supported lever engaged with said piston at one end and carrying a latch at the other end thereof, said latch being engageable with said contact carrying arm, a second contact secured to said bars, resilient means for biasing said first contact, away from said second contact, a source of compressed air, said piston being operative upon the admission of said compressed air into said cylinder to rotate said lever, said latch and said contact carrying arm to cause contact engagement.

5. A single pole circuit interrupter comprising a pair of insulated bars, a contact structure detachably secured to said bars, said structure comprising a pivoted contact carrying arm, a first contact at one end of said arm, a pneumatic cylinder and piston, a pivotally supported lever engaged with said piston at one end and carrying a latch at the other end thereof, said latch being engageable with said contact carrying arm, a second contact secured to said bars, resilient means for biasing said first contact away from said second contact, a source of compressed air, said piston being operative upon the admission of said compressed air into said cylinder to rotate said lever, said latch and said contact carrying arm to cause contact engagement, said resilient means being operative to separate said contacts when said latch is disengaged and when said compressed air is exhausted from said cylinder.

6. In electrical protective equipment for a polyphase circuit, individual circuit breaker elements in each phase thereof, each of said elements comprising a pair of cooperable contacts biased, while held in closed position, toward the open circuit position, a pneumatic cylinder and piston, mechanism engaged by said piston and operable by displacements of said piston for closing and maintaining said contacts in current carrying engagement, a latch mechanically maintaining said mechanism in rigid relation, the operation of said contacts to closing position being effected while said latch maintains said mechanism in rigid relation, and automatic means responsive to predetermined circuit conditions at said contacts for operating said latch to disengage said piston from said mechanism and for operating said contacts into disengagement while said piston of said pneumatic cylinder is displaced to contact closing position, and means whereby when said piston is displaced to its non-closing position, said latch rapidly reengaging said mechanism for operation of said contacts by said piston.

7. In a first circuit breaker having a fixed and movable contact, a first pivoted arm for carrying said movable contact, a source of compressed fluid, a second pivoted arm operable by said source of compressed fluid, a latch connection between said arms for rocking said first pivoted contact arm under control of said second pivoted arm to the position in which said movable contact engages said fixed contact, means for biasing said movable contact to its open position against the action of said compressed fluid, said means being normally ineffective to disengage said contacts against the action of said compressed fluid, means responsive to circuit conditions at said contacts for operating said latch to disengage said first arm from said second arm whereby said first contact arm operates under the action of said biasing means to open position, and means operative under control of said compressed fluid for operating said second arm into relatching engagement with said first contact arm, whereby said compressed fluid regains control of said movable contact to operate it into engagement position.

8. In a circuit breaker having a fixed and movable contact, a source of compressed fluid, a piston operated by said fluid, a rigid mechanical connection extending from said piston to said movable contact and including a latch, means responsive to circuit conditions at said contacts for operating said latch to mechanically disengage said movable contact from said piston, means for normally biasing said movable contact to open position and operable when said latch is disengaged to operate said movable contact to disengaged position while said piston is in circuit closing position under control of said fluid.

9. In a circuit breaker having a fixed and movable contact, a source of compressed fluid, a mechanical connection extending from said source of compresed fluid to said movable contact and including a latch, means selectively responsive to circuit conditions at said contacts and manually operable for operating said latch to disengage said movable contact from said source of compressed fluid, means for normally biasing said movable contact to open position and operable when said latch is disengaged to operate said movable contact to disengaged position while said source of compressed fluid is in circuit closing position.

WILLIAM MAXWELL SCOTT, Jr.